June 10, 1969 H. E. TREKELL ET AL 3,448,617
LIQUID LEVEL SENSOR ADAPTED FOR USE IN HYDROCARBON FUELS
Filed May 18, 1967
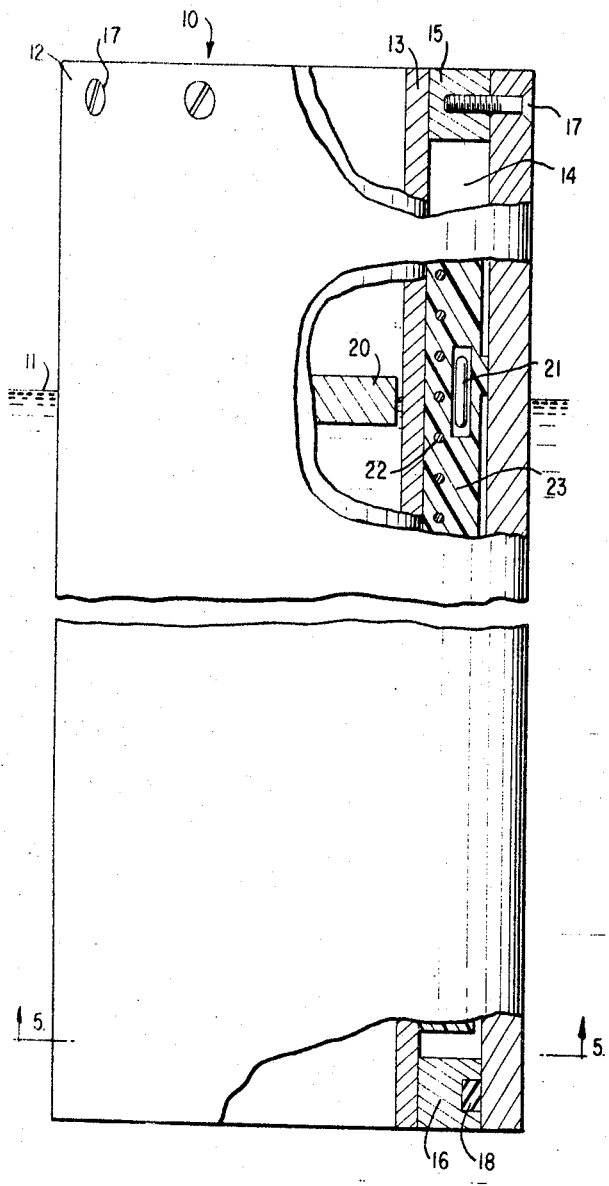
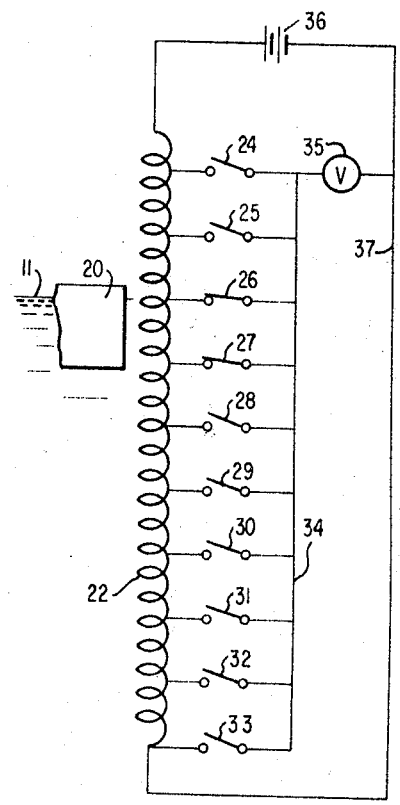
INVENTORS
HAROLD E. TREKELL
JOE A. WARBURTON
BY Richard E. Hosley
ATTORNEY FIG. 3
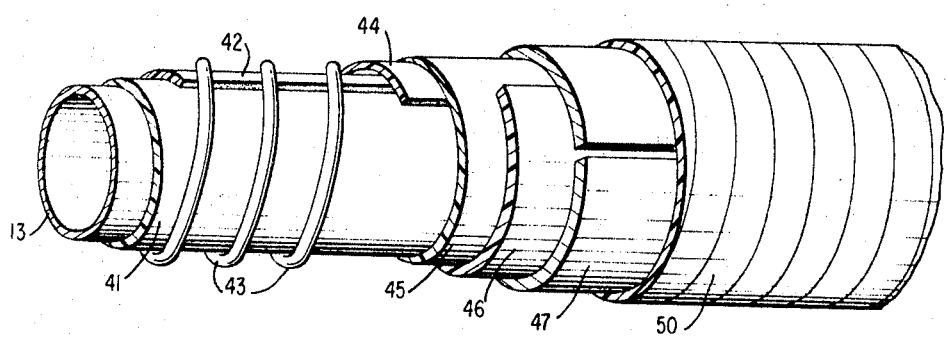
FIG. 4
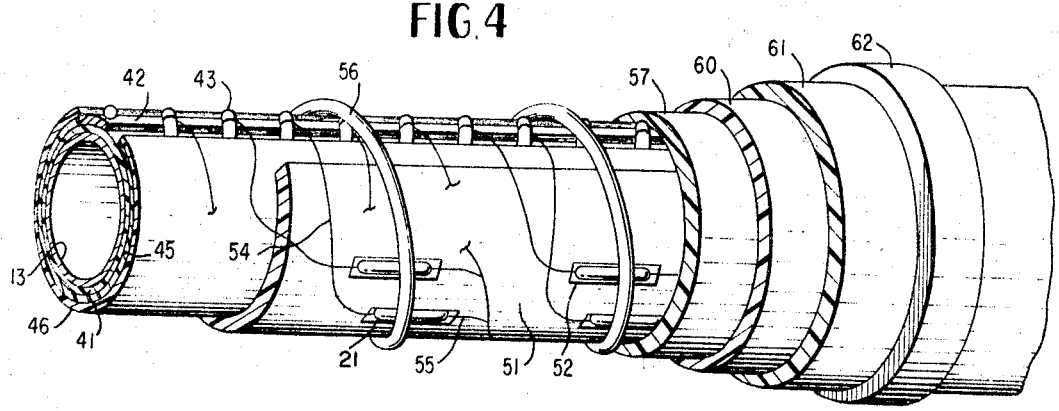
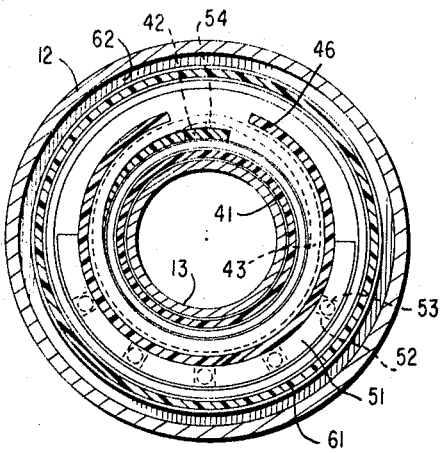
FIG. 5
INVENTORS
HAROLD E. TREKELL
JOE A. WARBURTON
BY *Richard E. Hosley*
ATTORNEY

United States Patent Office 3,448,617
Patented June 10, 1969

3,448,617
LIQUID LEVEL SENSOR ADAPTED FOR USE IN HYDROCARBON FUELS
Harold E. Trekell, Wakefield, and Joe A. Warburton, Melrose, Mass., assignors to General Electric Company, a corporation of New York
Filed May 18, 1967, Ser. No. 639,469
Int. Cl. G01f 23/28
U.S. Cl. 73—313                12 Claims

ABSTRACT OF THE DISCLOSURE

A liquid level sensor has magnetic switches and a resistance coil encapsulated in electrical insulating material formed of alternate layers of polyimide films and compatible thermoplastic polymers.

Background of the invention

This invention is directed to liquid level sensors and more particularly to liquid level sensors adapted for immersion in high-temperature hydrocarbon fuels.

In recent years it has become important to provide accurate fuel level measurement, especially in aircraft fuel tanks. Several liquid level sensors have been developed which are designed to be immersed in the tank to provide an electrical output indicating either the level or quantity of the fuel in the tank. In these devices the electrical components have been insulated by conventional insulating materials to avoid short circuits within the tank and in the fuel. However, these materials have been found to deteriorate rapidly when exposed to fuel at elevated temperatures. To overcome this condition, certain liquid level sensors have been sealed by means of O-rings or other similar gasket-type materials; but it has been found that these too have ultimately failed, causing a loss of the fuel reading.

It is an object of this invention to provide an improved liquid level sensor.

Still another object of this invention is to provide an improved liquid level sensor wherein the electrical insulating material is compatible with hydrocarbon fuels.

Yet another object of this invention is to provide an improved liquid level sensor which is compatible with hydrocarbon fuels and which is designed to facilitate manufacture.

Summary

Briefly, in accordance with one aspect of this invention, resistance means and switching means are adapted to provide a variable electrical signal and are encapsulated in an electrical insulation which is compatible with the liquid in which the insulation is to be immersed.

This invention is pointed out with particularity in the appended claims. A more thorough understanding of the above and further objects and advantages of this invention may be had by referring to the following detailed description taken in conjunction with the drawings.

Brief description of the drawings

FIGURE 1 presents a pictorial illustration of a liquid level sensor formed in accordance with this invention having certain portions broken away to show some detail;

FIGURE 2 presents a schematic diagram of a switching network adapted for use in a liquid level sensor constructed in accordance with this invention; and FIGURES 3 through 5 present enlarged detail drawings to illustrate the construction of such a liquid level sensor.

Description of the preferred embodiment

Referring to FIGURE 1, the liquid level sensor 10 is shown as being immersed in liquid 11. The sensor is constructed with an outer housing 12 which is usually annular in cross-section and an inner housing or core 13 which is also usually annular and spaced from the outer housing 12 so as to form an annular space 14 between the housings. The housings are located by annular flanges 15 and 16 located at either end of the fuel level sensor 10, and the two housings are joined by fastening means such as screws or machine bolts 17 which are tapped into the upper annular flange 15, this flange being welded or otherwise affixed to the core 13. The lower annular flange 16, also affixed to the core 13, has a circumferentially extending slot formed therein to retain an O-ring 18 or other spacing device. The O-ring 18 centers the core 13 with reference to the outer housing 12 and also tends to dampen vibration between the two elements.

A magnet float 20 is disposed in the bore of the core 13 and is positioned longitudinally along the bore in response to the level of the liquid 11. The magnetic field emanating from the magnet float 20 is coupled through the core 13 to switching means 21 disposed along the length of the core 13 and connected to a resistance, shown as a tapped resistance coil 22 also disposed along the length of the core 13. Both elements are encapsulated in insulating medium 23 which is defined in detail hereinafter.

In FIGURE 2 a plurality of switches 24 through 33 each similar to the switching means 21, are respectively connected between taps on the resistance coil 22 and a common conductor 34. Magnetic reed switches are particularly adapted to this application because they have a long operational life. As the magnet float 20 moves along the coil 22 in response to the height of the liquid 11, the switches adjacent the magnet float 20 are closed. For example, switches 26 and 27 are both closed.

Therefore, this structure resembles a potentiometer wherein the resistance coil 22 constitutes the resistance element and the conductor 34 together while the appropriate closed switches constitute the slider. The voltage at the conductor 34 can then be measured by a voltmeter 35 if the resistance coil 22 is energized by a power supply such as a battery 36 connected between one side of the coil and a conductor 37 from the other side of the resistance coil 22. Such a voltmeter could be connected to the conductors 34 and 37 by respective first and second terminals. In this arrangement the voltmeter 35 registers a voltage proportional to level and, if the taps are properly located, the liquid quantity.

Where current indications are required, the system could be easily converted to provide a current output by using the switches to short circuit sections of the resistance coil 22 and energizing the circuit with a constant voltage source. In another scheme a switching arrangement as claimed in Patent 3,200,645, Levins, issued Aug. 17, 1965 and assigned to the same assignee as the present invention might be used.

To understand the structure of the insulating medium 23, reference should be made to FIGURES 3 through 5 and the discussion of constructing such a liquid level sensor. Like numerals will be used to designate like elements throughout.

Referring to FIGURE 3, the core 13 is shown as being a right cylinder in the horizontal position. About the core 13 is wrapped one or more layers of an insulating material formed of a composite film. One particularly well adapted composite film is that formed by a central polyimide film, with outer layers of a fluorinated ethylene propylene thermoplastic polymer which is compatible with the polyimide film. As a result of this wrapping, there is, therefore, a first insulating layer 41 formed by distinct layers of a polyimide film and a thermoplastic polymer.

After the first insulating layer 41 has been wrapped onto the core 13, a nonthermoplastic polymer bridge 42 is disposed longitudinally along the wrapped core 13. One material which is adapted for use on the bridge is a fluorinated polyethylene polymer.

Subsequently, a coil 43 of resistance wire is helically wrapped along the length of the liquid level sensor over both the first insulating layer 41 and the bridge 42. This coil 43 constitutes the coil 22 illustrated schematically in FIGURE 2. Wrapping in this manner causes small spaces or gaps between the turns of resistance coil 43 and the first insulating layer 41 adjacent the edges of the bridge 42.

Thereafter, a strip of a glass-backed, pressure-sensitive silicone adhesive tape having a width slightly greater than the width of the bridge 42 is disposed longitudinally over the resistance coil 43 above the bridge 42. This tape constitutes a zipper tape 44 which is subsequently removed.

A strip of thermoplastic film 45 is wrapped over the coil 43 and zipper tape 44. Then a strip of the composite polyimide-thermoplastic polymer film may be disposed about a portion of the sensor to constitute a layer 46. This layer is optional but is designed to eliminate cut-through by the coil 22 and other elements under vibration. For example, a strip of the composite film having a width sufficient to encircle the sensor except for the area above the zipper tape 44 could be used.

When this step is completed, the entire assembly is located in a molding device such as aluminum clamshell mold 47, and the mold is thereafter wrapped with a sacrificial tape 50. The tape is chosen so that it will shrink when heated.

This assembly is then fired in a furnace for a time and at a temperature sufficient to cause bonding of the thermoplastic polymer to adjacent layers of either polyimide or thermoplastic polymers. After the assembly has been heated and subsequently cooled, the sacrificial tape 50 and the mold 47 are removed to provide an assembly having a resistance coil 43 encapsulated between distinct layers of a polyimide film and a thermoplastic polymer. However, the zipper tape 44, still molded into the assembly, prevents the thermoplastic polymer from encapsulating the gap adjacent the overlapped edge of the bridge 42.

After the zipper tape is removed, as shown in FIGURE 4, the gap is exposed adjacent the one side of the bridge 42. A generally semicircular switch holding layer 51 is positioned against the second insulating layer 46 and diametrically across from the bridge 42. Slots 52 are provided in the switch holding layer 51 to respectively accommodate a switching means 21 and are oriented so that the plurality switching means 21 is uniformly spaced along the length of the sensor. If the switch holding layer 51 is formed of metal, additional insulating means are necessary. However, a single piece of insulating material might also be used as shown herein.

Switching means are located in each slot 52 and, as discussed hereinabove, magnetic reed switches are particularly adaptable to use in this type of liquid level sensor. One such switch 21, has one lead extending to a turn of the resistance coil 43 to which it is affixed by brazing or other similar method above the bridge 42. This lead is designated by numeral 54. The other switch lead 55 can then be connected to a common conductor.

By using the helical resistance coil 43 and the switch holding layer 51, it is possible to quickly and easily manufacture a liquid level sensor which automatically converts liquid level into quality regardless of the tank configuration. If the tank is regularly configured, then taps can be taken equidistantly along the resistance coil 43. However, if the tank is irregularly configured, the sensor can be calibrated to provide liquid quantity signals by tapping the resistance coil at appropriate turns. The quantity signal obtained is then easily converted to indicate fuel weight or mass.

During this operation the switch holder is affixed in place by wrapping a nonthermoplastic material thereabout. For example, a nonthermoplastic polymer tubing 56, can be helically wrapped along the length of the liquid level sensor to mechanically fasten the switch holder and switches in place. At this time other circuit elements such as compensating resistors or additional wiring can also be added to the sensor.

Thereafter the entire assembly is wrapped with a film of thermoplastic polymer 57. As these thermoplastic polymer 57. As these thermoplastic polymers are generally substantially transparent, it is possible after this wrapping to finally locate and dress the switches and leads along the length of the sensor. After this initial wrapping, additional thermoplastic polymer layers 60 are wrapped around the entire length of the unit. Upon completion of this wrapping procedure, a plurality of layers of the composite film of polyimide and thermoplastic polymer is also wrapped about the device to form a third insulating layer 61.

If it is necessary to pace the assembled sensor from the outer housing 12, bumpers 62 can be formed at intervals along the sensor length by periodically circularly wrapping the composite film to the proper radius and then continuing to helically wrap the tape along the length of the sensor.

After the composite film is finally wrapped along the entire length of the sensor, the entire sensor is again subjected to a heat treatment at a temperature and of a duration sufficient to cause all layers of the thermoplastic polymer to melt and flow. After this operation the liquid level sensor assembly can be inserted into the outer housing 12 and affixed thereto.

An example of the finished sensor is shown in FIGURE 5. It should be realized that on examining this figure, dimensions and representations are not exact in order to provide a clearer understanding of the composition of the insulating material.

Examining this cross-sectional view radially from the center, it will be seen that the inner core 13 has a first insulating layer 41 wrapped thereabout. This insulating layer 41 comprises alternate layers of the thermoplastic polymer and the polyimide film. As shown, the first insulating layer 41 is formed by two layers of the composite film; however, the exact thickness and number of film layers will be determined by the particular application. This will be true of the remainder of the discussion of FIGURE 5.

Encapsulated in a thermoplastic polymer formed by the outer thermoplastic film on the first insulating layer 41 and the subsequently applied thermoplastic polymer layers are the bridge 42 and the resistance wire 43.

FIGURE 5 also shows a switch lead 54 from one of the reed switches as being affixed to the resistance coil above the bridge 42. It is pulled into this position after being inserted through the gap formed adjacent the bridge 42. The gap is subsequently filled with thermoplastic polymer from layers 45, 57 and 60. In addition to the thermoplastic polymer, the single layer of polyimide film 46 serves to space the switch holding layer 51 with its switches 21 located in slots 52 from the resistance coil 43. The polyimide film on the second layer is contiguous the switch holding layer 51. This entire assembly is then encapsulated in the thermoplastic film produced by the layers 57 and 60 and then is surrounded by alternate layers of the polyimide film and the thermoplastic polymer to constitute the third insulating layer 61. Also shown is a bumper 62 which spaces the assembly from the outer housing 12.

The various insulating layers and elements affixed to the core 13 provide a structure having switching means and resistance means encapsulated in an insulating medium formed of alternate layers of a polyimide film and a thermoplastic polymer compatible with that polyimide film. It has been found that such an assembly is compatible with hydrocarbon fuels over an extended temperature range such as that normally encountered in the operation of certain jet aircraft. Requirements for sealing the assembly are therefore eliminated.

Good electrical insulation and vibration characteristics are obtained while not affecting the magnetic coupling of a magnet in the center of the core with the various switches. Sensor manufacture is simplified and economical. The weight of the total sensor constructed in this form is lighter than those constructed in the prior art, a considerable advantage in aircraft.

A substantially more reliable liquid level sensor is obtained because continuous winding of the resistance coil precludes the possibility of failure encountered in some prior art devices wherein a chain of individual resistors in series was used. Furthermore, greater flexibility in the design is obtainable with standard parts because standard resistors could not always be used when irregular tank shapes were encountered.

What is claimed as new and desired to be secured by Letters Patent of the United States is:

1. A liquid level sensor for providing a signal between first and second terminal means responsive to such level, comprising:
   a first housing means;
   a first insulating section bonded to said first housing means composed of distinct layers of a polyimide film and a thermoplastic polymer compatible with said polyimide film;
   resistance means disposed along said first insulating section;
   liquid level condition responsive switching means connected to said resistance means to vary the resistance of said resistance means in response to such condition;
   a layer of said thermoplastic polymer partially encapsulating and spacing said switching means and said resistance means and bonded to said first insulating section;
   a second insulating section bonded to said thermoplastic polymer layer composed of distinct layers of said polyimide film and said thermoplastic polymer; and
   second housing means surrounding said second insulating section and connected to said core member to form a unitary assembly.

2. A liquid level sensor as recited in claim 1 wherein said thermoplastic polymer is a fluorinated ethylene propylene thermoplastic polymer.

3. A liquid level sensor as recited in claim 2 wherein said resistance means comprises a helical coil wrapped about said first insulating section and conductor means connecting said resistance coil to said first terminal means.

4. A liquid level sensor as recited in claim 3 additionally comprising a spacer strip of a nonthermoplastic polymer compatible with said thermoplastic polymer extending longitudinally along said sensor and encapsulated in said thermoplastic polymer layer, said spacer strip being located between said first insulating section and said resistance means.

5. A liquid level sensor as recited in claim 2 wherein said switching means comprises a plurality of switches connected between one of said conductors and selected taps on said resistance means to vary the resistance at said first terminal means as a function of the condition and switch holding and locating means for positioning said switches longitudinally along the sensor.

6. A liquid level sensor as recited in claim 5 wherein said switch holding and locating means is constituted by a semicircular support having a plurality of slots therethrough, said slots being positioned to locate the switches linearly along the longitudinal dimension of said sensor, said switches being spaced from said spacer strip.

7. A liquid level sensor as recited in claim 6 wherein said switching means includes a magnetic float means and wherein said first housing means adjacent said magnetic float couples the magnetic field to said switches, said switches adjacent said float responding to said magnetic float by closing.

8. A liquid level sensor as recited in claim 7 wherein said first housing means is formed of an annular member, said magnetic float being located in the center of said first housing means.

9. A liquid level sensor as recited in claim 2 wherein said first insulating section is formed by wrapping a composite film about said core in an overlapping configuration, said composite film being a composite of said polyimide film sandwiched between films of said thermoplastic polymer.

10. A liquid level sensor as recited in claim 9 additionally comprising a third insulating section of said polyimide film and said thermoplastic polymer disposed between said resistance means and said switching means, said insulating section being formed of said composite film.

11. A liquid level sensor as recited in claim 10 wherein said second insulating section has portions thereof formed by circularly wrapping said composite film in additional layers to form bumpers spaced longitudinally along said sensor.

12. A liquid level sensor comprising:
   an annular, nonmagnetic inner housing;
   a first insulating section bonded to said inner housing formed of a composite film in an overlapping configuration, said composite film being constituted by a polyimide film layer sandwiched between layers of a fluorinated ethylene propylene thermoplastic polymer;
   a nonthermoplastic fluorinated polyethylene polymer strip disposed longitudinally along a portion of said first insulating section and contiguous therewith;
   a helical coil of resistance wire wrapped over said first insulating section and said strip to be spaced from said first insulating section adjacent said strip;
   a semicircular switch holding means disposed diametrically from said strip;
   a floatable magnet and a plurality of magnetically actuated switches each having one contact conductor connected to selected points on said coil adjacent said strip, each of the other contact conductors being connected in common;
   a second insulating section formed of said composite film in an overlapping configuration between said coil and said switch holding means;
   a layer of said fluorinated ethylene propylene thermoplastic polymer encapsulating said switch holder and said switching means;
   a third insulating section formed of overlapping layers of said composite film disposed over said last named layer; and an outer housing member connected to said inner housing member and spaced therefrom in contact with said third insulating section.

References Cited
UNITED STATES PATENTS

| | | | |
|---|---|---|---|
| 2,289,202 | 7/1942 | McCoy | 73—313 |
| 2,556,346 | 6/1951 | Stromberg | 73—313 |
| 2,685,797 | 8/1954 | Morschel | 73—313 X |
| 2,976,378 | 3/1961 | Goddard | 200—84.3 X |
| 3,083,259 | 3/1963 | Wells | 174—68.5 |
| 3,106,693 | 10/1963 | De Giers | 338—33 |
| 3,179,634 | 4/1965 | Edwards | 174—110.43 |
| 3,254,188 | 5/1966 | Lohs. | |
| 3,215,574 | 11/1965 | Korb | 29—625 X |

LOUIS R. PRINCE, *Primary Examiner.*

D. M. YASICH, *Assistant Examiner.*

U.S. Cl. X.R.

174—52; 338—33